United States Patent [19]

Maiocco et al.

[11] 4,422,207
[45] Dec. 27, 1983

[54] PLASTIC WIPER BLADE

[75] Inventors: Giuseppe A. Maiocco, Rivoli; Sergio Vidoni, Torini, both of Italy

[73] Assignee: Champion Spark Plug Italiana S.p.A., Druento, Italy

[21] Appl. No.: 396,262

[22] Filed: Jul. 8, 1982

[51] Int. Cl.³ .............................................. B60S 1/38
[52] U.S. Cl. .............................. 15/250.42; 15/250.32
[58] Field of Search ........................ 15/250.32–250.42

[56] References Cited

U.S. PATENT DOCUMENTS

| | | | |
|---|---|---|---|
| 2,649,605 | 8/1953 | Scinta et al. | |
| 3,177,514 | 4/1965 | Wise | 15/250.42 |
| 3,178,753 | 4/1965 | Wise | 15/250.42 |
| 3,576,044 | 4/1971 | Besnard | |
| 4,177,537 | 12/1979 | Roadarmel | |
| 4,195,382 | 4/1980 | Macpherson | |
| 4,293,974 | 10/1981 | Gowans | |
| 4,360,942 | 11/1982 | Dal Palu | 15/250.42 |

FOREIGN PATENT DOCUMENTS 1568131 11/1977 United Kingdom .
2021936 12/1979 United Kingdom .

Primary Examiner—Peter Feldman
Attorney, Agent, or Firm—Wood, Dalton, Phillips, Mason & Rowe

[57] ABSTRACT

A windshield wiper blade is disclosed and, in particular, a plastic wiper blade having a main bridge and two secondary yokes pivotally linked to the end portions of the main bridge. Each of the secondary yokes are provided with an aperture wherein extends a transverse pivot. The main bridge is provided at each of its two end portions with a fork, the limbs of which extend substantially in the prolongation of the main bridge and define a seat for said transverse pivot of each secondary yoke. The wiper blades are, for example, used on motor vehicles.

7 Claims, 7 Drawing Figures

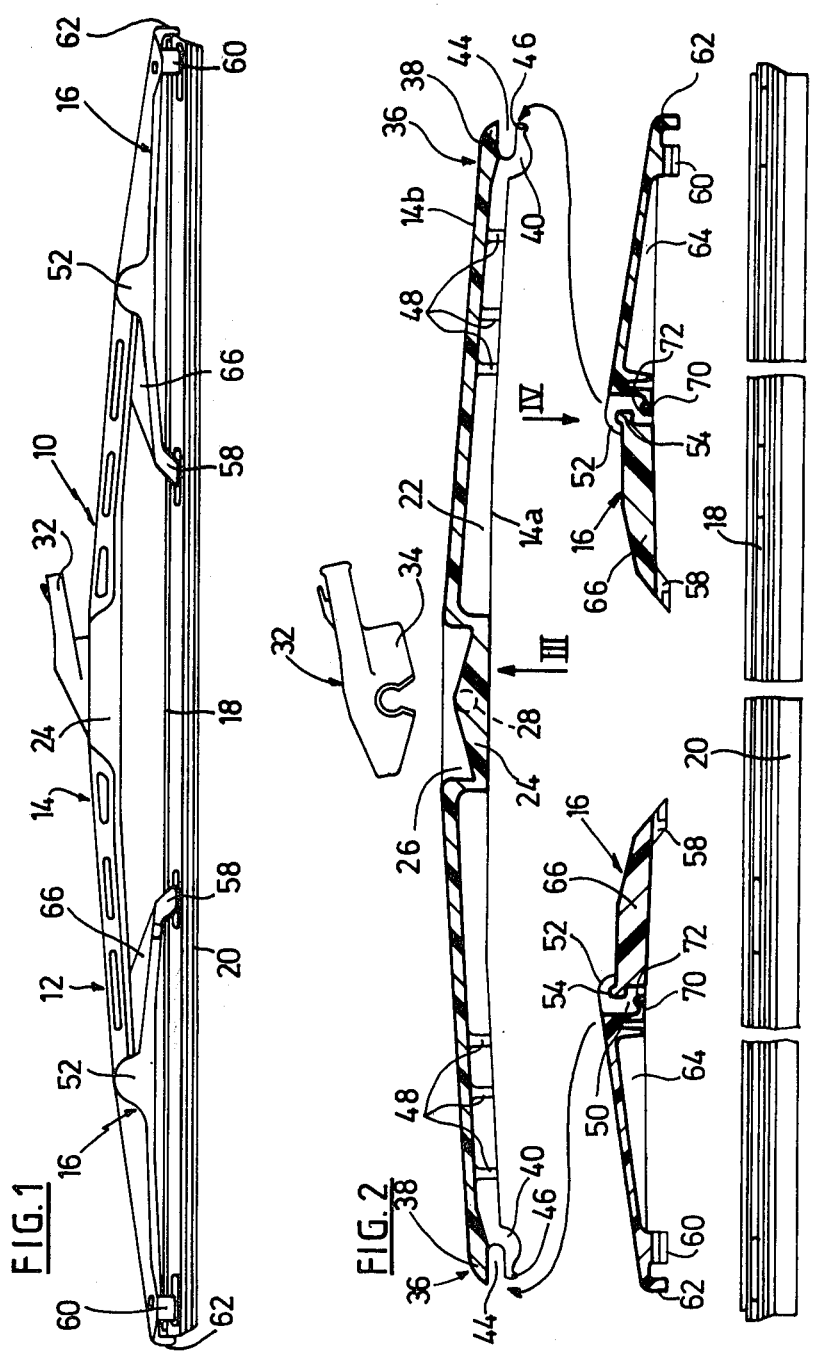

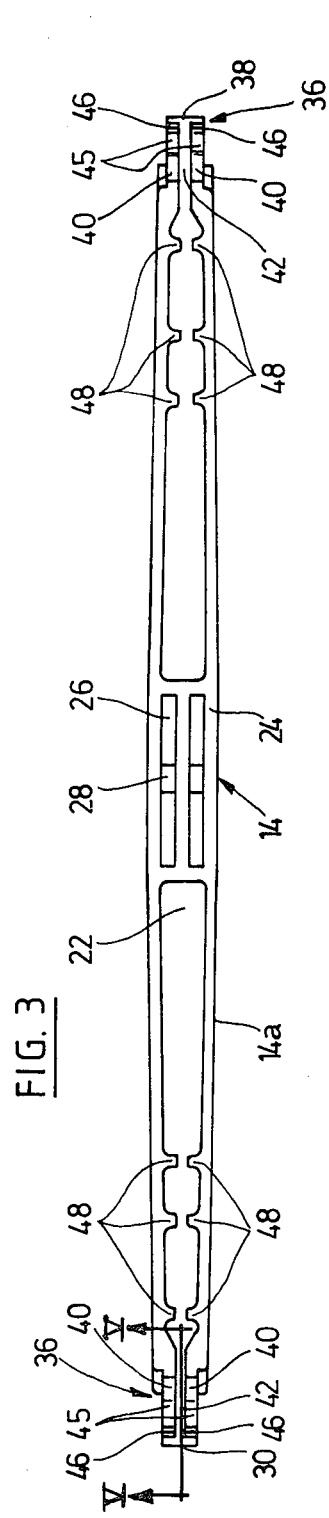
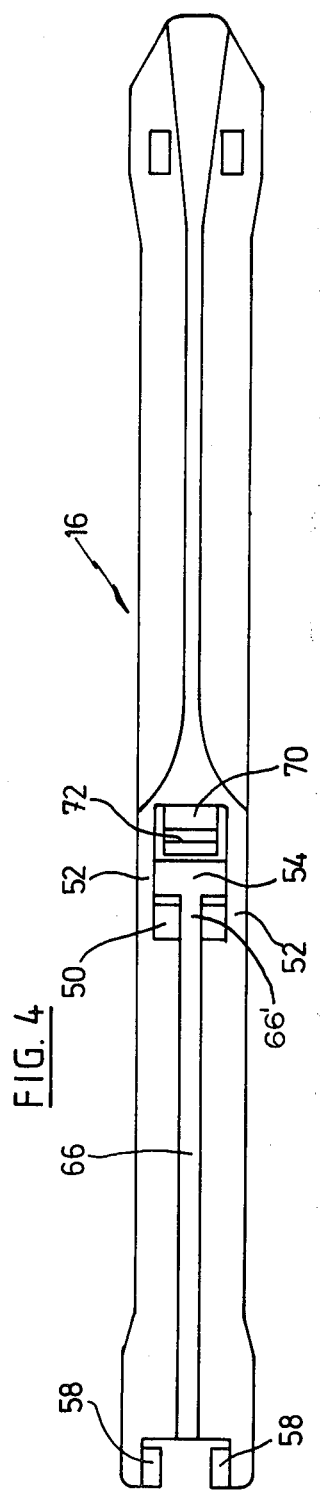
FIG. 3
FIG. 4

PLASTIC WIPER BLADE

DESCRIPTION

Technical Field

This invention relates to windshield wiper blades and more particularly to the connection between a main bridge and at least one secondary yoke of said wiper blade.

Background of the Invention

Windshield wiper blades having articulated members have been known for many years. Many early articulated members were connected together by rivets which permitted the members to pivot in a plate transverse to the axis of the rivet. The rivets were permanent so that the respective members could not be readily taken apart. An improved connection between the articulated members was then devised that permitted the same pivoting movement, but which connection was snapped together using resiliently yielding retaining elements. The retaining elements could be loose causing undesirable play in the connection area. The snapped together connection required additional parts, additional assembly time and steps and additional cost.

The present invention is directed to overcoming one or more of the problems as set forth above.

Disclosure of the Invention

A windshield wiper blade is disclosed and, in particular, a plastic wiper blade having a main bridge and two secondary yokes pivotally linked to the end portions of the main bridge. Each of the secondary yokes are provided with an aperture wherein extends a transverse pivot. The main bridge is provided at each of its two end portions with a fork, the limbs of which extend substantially in the prolongation of the main bridge and define a seat for said transverse pivot of each secondary yoke. The wiper blades are, for example, used on motor vehicles.

One aspect of the present invention is to provide a wiper blade in which the connections between the main bridge and the secondary yokes are realized by quick, very simple and functional pivot connections, so as to facilitate the assembly of the superstructure of the blade in reducing the manufacturing costs, but without using, as known in the prior art, snapping devices with resiliently yielding retaining elements which may cause, during use, undesirable play in the linkage areas.

The wiper blade according to the invention is substantially characterized by the fact that the main bridge is provided at each of its two ends with a fork and the secondary yokes are each provided with an aperture in which a transverse pivot is located. The main bridge and secondary yokes have cooperating first and second stop means spaced from said transverse pivots and capable of preventing the withdrawal of the transverse pivots from their respective seats.

The first stop means of the two forks is formed by a cylindrical portion provided on the outer surface of the lower limbs of said forks and the first stop means of the two secondary yokes is formed by a corresponding cylindrical surface provided on the inner surface of said apertures of said secondary yokes.

The second stop means of the two forks is formed by a hook provided at the end portions of each of the lower limbs of said forks and the second stop means of the two secondary yokes is formed by corresponding hooks projecting into each of said apertures of said apertures of said secondary yokes.

Brief Description Of Drawings

The invention will be better understood when reading the following portions of the specification in conjunction with the accompanying drawings wherein:

FIG. 1 is a side elevational view of a wiper blade according to the invention;

FIG. 2 is a view similar to that of FIG. 1 showing the different elements of the blade prior to assembly and partially in a sectional view;

FIG. 3 is a bottom view of the main bridge along arrow III of FIG. 2;

FIG. 4 is a top view of a secondary yoke along arrow IV of FIG. 2;

Figure 5:
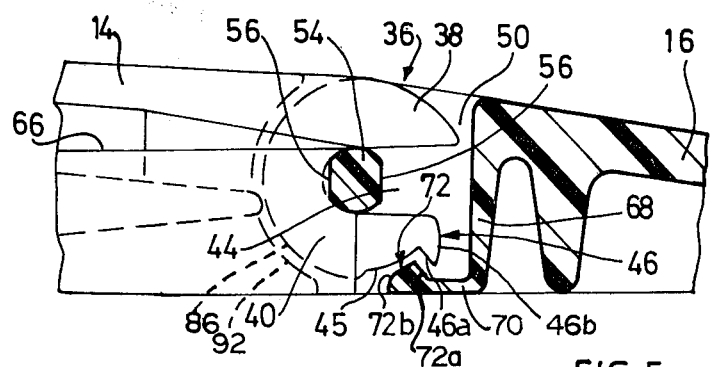
FIG. 5 is, at an enlarged scale, a sectional view along line V—V of FIG. 3 after the secondary yoke of FIG. 4 has been assembled thereto.

Best Mode For Carrying Out The Invention

On the drawings, reference numeral 10 generally designates a plastic wiper blade comprising a superstructure 12 consisting of a main bridge 14 and two secondary yokes 16 and comprising a resilient backing strip 18 connected to the secondary yokes 16 and carrying a rubber wiping element 20.

Referring now more particularly to FIGS. 2 and 3, the main bridge 14 has a substantially U-shaped or channeled transverse section, the cavity 22 of which is directed towards the secondary yokes 16. In its central portion 24, the main bridge is provided with a rectangular aperture 26 through which extends a transverse pivot 28 for attaching thereto a connector 32 which comprises a fork shaped snapping device 34 for pivotally and releasably attaching a wiper arm (not shown) to the wiper blade 10.

The two end portions of the main bridge 14 are each provided with a fork 36 comprising one upper limb 38 and two lower limbs 40. The upper limb 38 of each fork 36 substantially extends in the prolongation of the upper surface 14b of the main bridge 14 and the two lower limbs 40, substantially parallel to the upper limb 38, are separated from each other by a notch 42 (FIG. 3) communicating with the cavity 22 of the bridge 14. The limbs 38,40 define a seat 44 for the pivot 54 provided in the secondary yokes 16 (FIG. 2).

As can be seen on FIGS. 2 and 4, each of the secondary yokes 16 is provided with a central aperture 50 defined by two side walls 52 between which extends the transverse pivot 54. On FIGS. 5, 6 and 7 the pivot is provided with two flat, diametrically opposed surfaces 56. It is however to be noted that these surfaces have no special function and that they are not a characteristic feature of the invention.

The secondary yokes 16 are provided, at each of their end portions, respectively, with inner claws 58 and outer claws 60 wherein is inserted the resilient backing strip 18 which carries the wiping element 20. The outer claws 60 of each secondary yoke 16 are furthermore associated with the stops 62 for axially retaining the resilient backing strip 18 and the wiping element 20.

On the inner surface of the side walls 14a of the main bridge 14, near the forks 36, there is provided a plurality of opposed ribs 48. The function of these ribs 48 will be explained in the following portions of the specification.

The portion of each secondary yoke 16 between the aperture 50 and the outer claws 60 has a U-shaped transverse section with a cavity 64 directed towards the wiping element 20. The remaining portion of the secondary yokes 16, i.e. the portion between the opening 50 and the inner claws 58 extends lower than the pivot 54 and is provided, at its top surface, with a longitudinal rib 66 which is connected, by means of an extension 66', to the pivot 54.

Considering now FIG. 5, wherein the secondary yoke 16 has been mounted on the main bridge 14, the first stop means of the bridge 14 consist of the cylindrical portion 86 of the two lower limbs 40 of the fork 36 and the corresponding first stop means of the secondary yoke 16 consist of the cylindrical surface 92 of the aperture 50 provided in said secondary yoke 16. When the secondary yoke 16 slightly rotates about the axis of the pivot 54, said cylindrical portion 86 and said corresponding cylindrical surface 92 slide one with respect to the other and, at the same time, prevent any longitudinal displacement of the secondary yoke 16 with respect to the main bridge 14, or, in other words, when the wiper blade according to the invention is in its working position the pivot 54 cannot be withdrawn from the fork 36.

The second stop means of the main bridge 14 consist of the hook 46 provided at the end portions 45 of the lower limbs 40 of said forks 36 and the second stop means of the secondary yoke 16 consist of the corresponding hook 72 projecting into said aperture 50 of the secondary yoke 16. When the secondary yoke 16 rotates about the axis of the pivot 54, the flat surfaces 46a,72a of the hooks 46,72 interact, i.e. they prevent the withdrawal of the pivot 54 from the fork 36. It is to be noted that when the outer portion of the secondary yoke 16 is in its lowest position (FIG. 5), the hooks 46,72 do not touch each other, this indeed being necessary for allowing the secondary yoke 16 to slightly rotate with respect to the main bridge 14.

Figure 6:
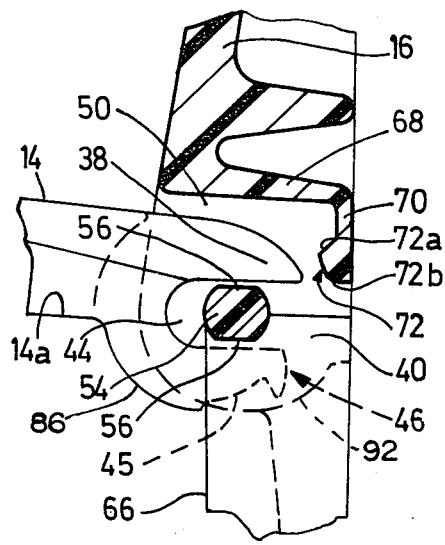
FIGS. 6 and 7 are sectional views similar to that of FIG. 5 showing how the secondary yokes are linked to the main bridge during assembly.

When assembling the different elements of the wiper blade according to the invention, the secondary yokes 16 are first connected to the main bridge. For this purpose the pivot 54 of one of the secondary yokes 16 will be inserted into the corresponding seat 44 of the bridge 14 when the yoke 16 is in a perpendicular position with respect to the main bridge 14 (FIG. 6). Once the pivot 54 is in contact with the bottom of the seat 44 the secondary yoke 16 is rotated clockwise (FIG. 7) so as to bring the rib 66 of the secondary yoke 16 into the cavity 22 of the main bridge 14 (FIG. 5). The secondary yoke 16 is now pivotally connected to the main bridge 14 and, as explained above, any longitudinal displacement of the secondary yoke 16 with respect to the bridge 14 is no longer possible.

Figure 7:
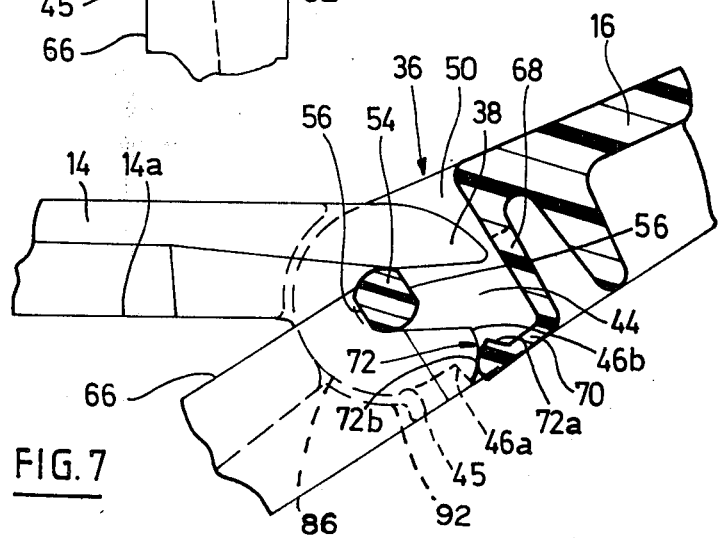

During the rotation of the secondary yoke 16 the curved back surface 46b of the hook 46 comes into contact with the curved back surface 72b of the hook 72 (FIG. 7). As the rotation goes on, the resilient wall 68 is elastically deformed so as to allow the hook 46 to pass over the hook 72 and consequently to allow the straight portion 70 of the hook 72 to return into its undeformed rest position as shown on FIG. 5.

When the wiper blade according to the invention is assembled, the two lower limbs 40 of the forks 36 are in a saddle-type relationship with the extensions 66' of the longitudinal ribs 66 of the secondary yokes 16. When said secondary yokes 16 rotate about the axis of their pivots 54, the ribs 66 enter into the cavity 22 of the main bridge 14 and more particularly into the space between said opposed ribs 48, the function of which is to avoid any excessive lateral play between the secondary yokes 16 and the main bridge 14.

During use the irreversable connection between the hooks 46,72 prevents any accidental separation of the secondary yokes 16 from the main bridge 14. Such a separation can only be done by deforming, by means of a suitable tool, the resilient walls 68 in order to disengage the hooks 46,72. Furthermore said hooks limit the rotation of the secondary yokes 16 about the axis of their respective pivots 54 in the direction corresponding to the disengagement of the longitudinal ribs 66 from the cavity 22 of the main bridge, thus preventing any accidental dental removal of the resilient backing strip 18 from the outer claws 60 due to an excessive traction exerted on the middle area of the strip 18 in the direction opposite to the superstructure 12, for example when cleaning the wiping element 20.

One embodiment of the wiper blade according to the invention has thus been described. It is however to be understood that modification and/or changes may be made without departing from the scope of the invention such as defined in the appended claims.

We claim:

1. A plastic wiper blade comprising a main bridge and two secondary yokes, pivotally linked to the end portions of the main bridge, each of said secondary yokes being provided with an aperture wherein extends a transverse pivot and the main bridge being provided at each of its two end portions with a fork, the limbs of which extend substantially in the prolongation of the main bridge and define a seat for said transverse pivot of each secondary yoke, characterized in that the forks and the secondary yokes are each provided with cooperating first and second stop means spaced from said transverse pivots and capable of preventing the withdrawal of the transverse pivots from their respective seats.

2. A wiper blade according to claim 1, characterized in that each of the two forks of the main bridge comprises one upper limb and two lower limbs.

3. A wiper blade according to claims 1 or 2, characterized in that the first stop means of the two forks is formed by a cylindrical portion provided on the outer surface of the lower limbs of said forks and that the first stop means of the two secondary yokes is formed by a corresponding cylindrical surface provided on the inner surface of said apertures of said secondary yokes.

4. A wiper blade according to claims 1 or 2, characterized in that the second stop means of the two forks is formed by a hook provided at the end portions of each of the lower limbs of said forks and that the second stop means of the two secondary yokes is formed by corresponding hooks projecting into each of said apertures of said secondary yokes.

5. A wiper blade according to claims 1 or 2 wherein the main bridge has, at least in the area of each of its two end portions, a downwardly U-shaped transverse section, characterized in that each secondary yoke is provided, on its top surface, between said aperture and its inner end portion, with a longitudinal rib capable of entering into the longitudinal cavity of the corresponding U-shaped end portion of the main bridge.

6. A wiper blade according to claim 5, characterized in that the side walls of the U-shaped end portions of the main bridge are provided with a plurality of inwardly projecting ribs capable of guiding said longitudinal ribs of the secondary yokes.

7. A wiper blade according to claim 5, characterized in that said longitudinal rib of each secondary yoke has an extension projecting between said two lower limbs of the corresponding fork of the main bridge.

* * * * *